April 11, 1961 H. E. PRITCHARD ET AL 2,979,159
AIR FILTERS

Filed Dec. 2, 1958 2 Sheets-Sheet 1

INVENTORS
HUGH E. PRITCHARD
GREGORY P. SHALTZ
BY
Charles B. Willson
ATTORNEY

Patented Apr. 11, 1961

2,979,159
AIR FILTERS

Hugh E. Pritchard, Detroit, and Gregory P. Shaltz, Ann Arbor, Mich., assignors to Fram Corporation, Providence, R.I., a corporation of Rhode Island Filed Dec. 2, 1958, Ser. No. 777,624

1 Claim. (Cl. 183—70)

This invention relates to air filters that are highly effective in removing coarse and fine dirt and dust from an air stream and are capable of operating for a long time without becoming clogged with dirt.

More specifically, the present invention relates to air filters of the outside-in flow type which have a two-stage construction and comprise an outer filter batt and inner filter media of pleated paper. The construction and operation are such that the batt serves to remove the fine dust particles from the air stream while it permits the coarse dust particles to pass therethrough and lodge on the pleated paper where it forms a porous layer through which the air can readily pass.

As a result of this construction, the coarse particles, which if retained by the batt would quickly plug the same, pass through the batt to be stopped by the paper, and the fine dust particles that would plug the pores of the paper if they reached the same remain in the batt. This makes possible the use of a batt that is sufficiently porous to allow the air to pass readily therethrough, and it also makes possible the use of paper having comparatively large pores through which the air can readily pass. However, to secure the filtering operation just described, there must be a definite relation between the thickness and porosity of the batt and rate of air flow through the same.

The construction of this two-stage air filter should be such that at the lowest air velocity to be encountered in usual operation, the large particles (such as 80 microns and larger in diameter) will have enough velocity and energy to pass through the batt and be arrested by the sieve-like action of the pleated paper. At the highest velocity to be encountered, the small dust particles should still adhere to the fibers of the batt due to the fact that the mutual attractive force is larger in relation to the aerodynamic forces ending to dislodge the particles. This operation helps materially to prolong the effective filtering life of both the batt and paper without becoming plugged with dirt.

Since the efficient operation of this two-stage filter depends largely upon the rate of air flow through the same, the present filter is particularly well adapted for use to filter the air of combustion supplied to diesel engines. This is because diesel engines normally run at maximum speed and for the most part consume air at a nearly constant rate. The filter of the present invention, however, works well also to filter the air supplied to the carburetor of gasoline engines providing the batt and paper filter are designed for this field of use. The design should be such that the air velocity will not become so low that practically none of the air-borne dirt particles will penetrate through the batt, and on the other hand, the air velocity should not become so high that practically all of the dirt will be carried through the batt to reach the paper. If either of these conditions occurs for very long periods, plugging of either the batt or paper of the filter will result.

Having in mind the foregoing, one important feature of the present invention resides in a two-stage filter comprising of a filter batt that surrounds a cylinder of porous pleated paper and wherein the construction of the batt in relation to the normal flow of air therethrough is such that the fine dust particles will remain in the batt while the large dust particles pass therethrough to the pleated paper where they form a more porous layer on the surface of the paper.

In cases where considerable dirt is in the air to be filtered, the batt may become plugged with dirt more quickly than the pleated paper. Therefore, to prolong the filtering life of the present filter, the batt is made removable. Another feature of the present invention, therefore resides in means whereby the filter batt can be easily removed to be cleaned and used again or replaced.

Another feature of the present invention resides in the construction whereby the annular pleated filter element has end caps that are provided with beveled annular flanges which project outwardly beyond the pleated filter element and are adapted to be engaged by the opposite edges of the filter batt with a wedging action to form a tight seal at such edges.

The filter of the present invention was designed primarily to protect effectively internal combustion engines by removing from the air of combustion supplied thereto all dirt particles larger than a few microns in diameter. The present construction whereby the fine dust particles are stopped by the batt and the larger particles are stopped by the paper gives the engine excellent protection over a long period of time.

The above and other features of the present invention will be further understood from the following description when read in connection with the accompanying drawings, wherein.

Figure 1:
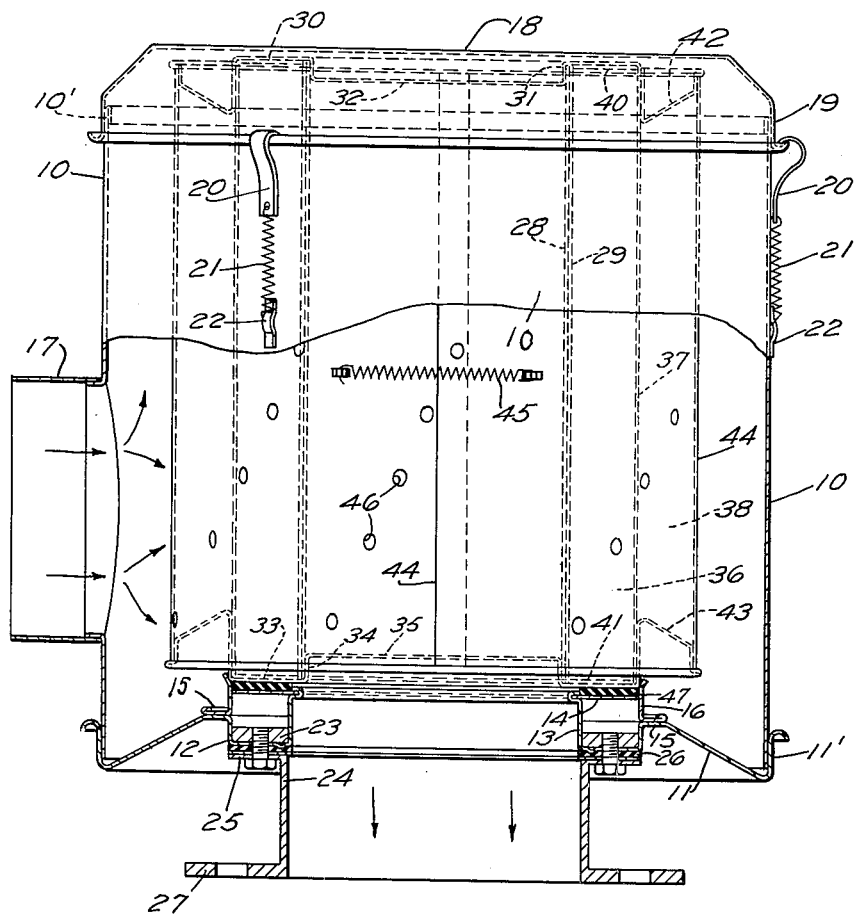
Fig. 1 is a side elevation with parts in vertical section of an air filter constructed in accordance with the present invention.
Figure 3:
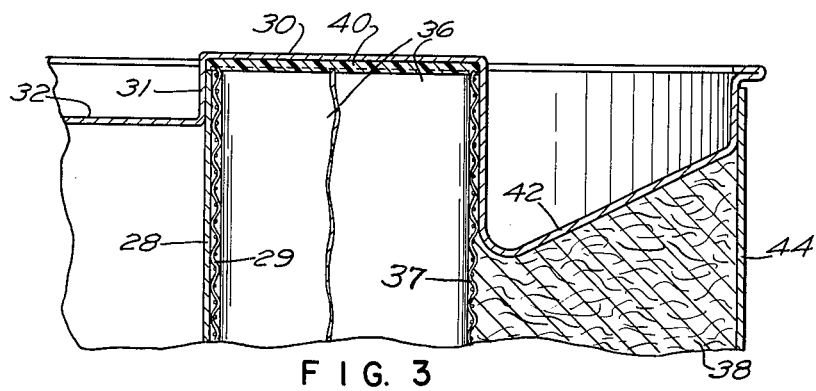
Figure 2:
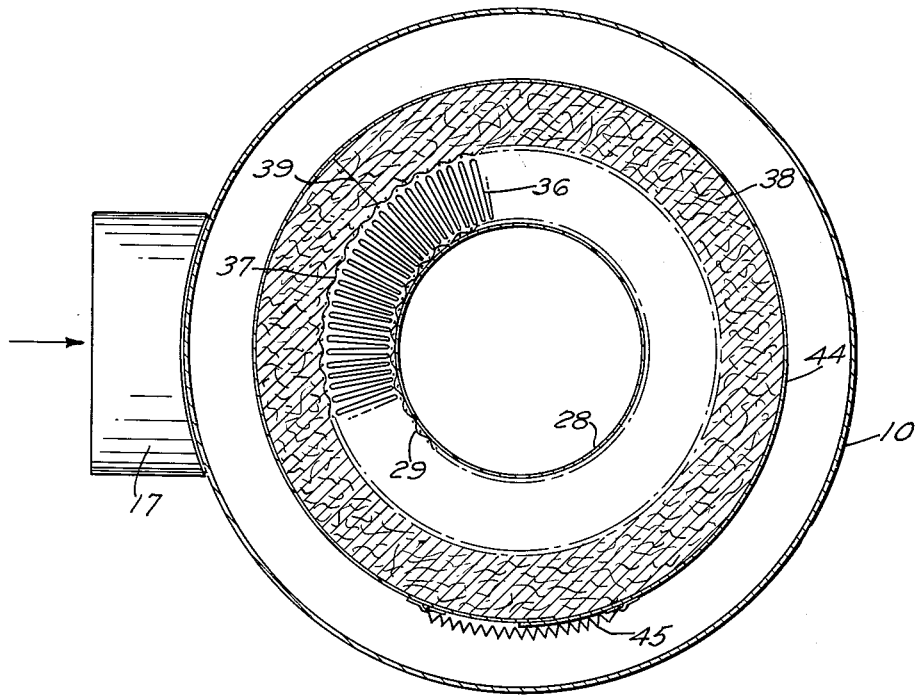
Fig. 2 is a horizontal sectional view of the filter shown in Fig. 1.

Fig. 3 on a much larger scale is a vertical sectional view through a portion of the upper end of the air filter cartridge shown in Fig. 1.

The present invention resides primarily in the air filter cartridge to be hereinafter described. Such cartridge can be used in various types of filter housing or shell. As shown in the drawings, such shell comprises a cylindrical wall 10 the lower end of which is closed by an end plate 11 having an upwardly extending outer flange 11' which embraces the lower end of the shell 10 and is spot welded or otherwise rigidly secured thereto. The end plate 11 is shown as having a depressed annular portion 12 for a purpose to be described and an upstanding annular inner wall 13. This wall is provided at its upper end with a rolled annular seam that embraces the inner edge portion of a metal plate 14 which has an offset annular portion 15 that is spot welded to the end plate 11. Within the shell or housing so far described is provided the annular cartridge centering wall 16 which is spot welded to a shouldered portion of the sheet metal member 14—15. This wall 16 serves to insure that the filter cartridge to be described will be properly centered in the shell or housing.

The air to be filtered enters the housing through an inlet pipe 17 extending from a lateral wall of the shell 10. The upper end of the shell wall 10 is preferably provided with a rolled seam 10', and this shell or housing is provided with a removable metal cover 18 having a downwardly extending annular apron 19 of a size to closely embrace the upper end of shell. In the construction shown, the cover 18 is removably secured in its closed position of Fig. 1 by any suitable means such as the hooks 20 that engage the outer annular flange of the cover. A constant downward pull is exerted on these hooks by the coiled springs 21 which are secured to the side wall of the shell by the metal loops 22. Three of the spring operated hooks 20 are preferably provided disposed at 120° from each other around the outer wall of the shell 10, and they serve to exert a continuous downward pull on the cover to hold the same firmly seated on the upper end of the filter cartridge.

The filter housing may be supported by any suitable means in its operating position, and in the construction shown, the annular depressed portion 12 above mentioned of the bottom plate 11 has rigidly secured therein a relatively thick ring 23 which is provided with several threaded bolt holes adapted to receive bolts employed to clamp an annular supporting bracket 24 to the lower portion of the air filter housing. This bracket has a laterally extending upper flange 25 which is bolted to the ring 23 and a gasket 26 is provided between the flange 25 and the portion of the filter housing to which it is bolted. The annular supporting member 24 has a lower annular flange 27 which may be bolted to the engine carburetor or other supporting means for the filter housing.

Having described one type of housing in which the two-stage filter cartridge of the present invention may be used, such air filter cartridge will now be described in detail.

In this connection, it should be pointed out that the air filter housing and cartridge shown in the drawing are relatively large in order that they may take care of the air requirements of a large engine. The outer filter housing shown may be about 10" high and 10" in diameter and the filter cartridge is only slightly smaller in outside dimensions. Therefore, to provide a filter cartridge of this size which is strong enough to stand up in service over a long period of use, it is desirable to make the center core of the cartridge relatively strong as it is relied upon to give strength to the entire cartridge.

In the construction shown, the filter cartridge is provided with an annular center core 28 of perforated sheet metal, and around this core is placed a fine screen 29 which serves as a fire check to keep a flame from the engine from reaching the pleated paper elment should the engine backfire. At the upper end of the center core just described is provided an end plate 30 having an annular flange 31 of a size to fit snugly in the upper end of the core 28. This end plate has the closure wall 32 which prevents air from entering at the upper end of the center core 28. The lower end of this core is provided with a similar end plate 33 having an annular central flange 34 adapted to fit snugly in the lower end of the core 28. It should be pointed out, however, that the lower end plate 33 has a large central opening 35 through which the filtered air leaves the cartridge on its way to the engine.

As above pointed out, the air filter cartridge of the present invention has a two-stage construction and comprises an annular pleated filter element 36 which embraces the annular wire screen 29. The outer periphery of this annular pleated element 36 is protected by an outer screen 37. About the pleated paper element 36 and screen 37 is placed the filter batt 38 which may have the form of a rectangular batt before it is applied about the pleated paper element. The length of this batt is such that when it is placed about the pleated element 36 to embrace the same, its ends will meet and abut at the line 39, and the width of the batt is such that it will extend throughout practically the entire length of the pleated filter element. The batt, however, need not be split as it may be given the form of a sleeve with its meeting ends sewed together. If in the form of a sleeve, it must be large enough in diameter to pass over an end plate 30 or 33 of the cartridge.

The upper end plate 30 is secured to the upper end of the pleated element 36 by a suitable bonding agent such as the plastisol 40, and the lower end plate 33 is secured to the lower end of the pleated paper element 36 by a similar bonding agent 41. This serves to seal both ends of the pleated filter element. The upper end plate 30 is provided with the annular beveled flange 42 disposed outside of the outer screen 37 and the pleated paper element, and the lower end plate 33 is provided with a similar beveled annular flange 43. The construction of these annular flanges 42 and 43 is such that they diverge outwardly so that when the filter batt 38 is placed closely about the pleated paper as shown in the drawing, the upper and lower edges of the batt will exert a wedging pressure against the flanges 42 and 43 to form an airtight seal at the upper and lower edge of the filter batt. The end plates 30 and 33 where they fit within the metal core 28 are preferably spot welded to the core to impart the desired strength to the cartridge.

The construction of the air filter cartridge as above described is such that the pleated paper element forms a permanent part of the cartridge, and if the pleated paper element becomes plugged with dirt, the entire cartridge should be replaced. On the other hand, the filter batt surrounding the pleated paper can be readily removed to clean the same or replace the same should it become plugged with dirt. It is contemplated in many cases that the batt will be clogged with dirt more readily than will the paper element so that it is desirable that the construction be such that the batt can be readily removed and cleaned or replaced. As a result of this construction, the filtering life of the cartridge can be greatly extended before the entire cartridge needs to be replaced.

In order to retain the batt in its operating position about the pleated paper filter element, there is provided a split annular metal jacket 44 which can be readily sprung open so that it can be applied to or removed from its batt embracing position in which it is shown. This jacket is held in its cartridge embracing position by a coil spring 45, one end of which is permanently secured to an end portion of the jacket and the other end is provided with a hook adapted to engage an eyelet provided on the other end portion of the jacket. This jacket is provided with the perforations 46 to allow the air to be filtered to pass inwardly through the batt and paper as indicated by the arrows in Fig. 1 of the drawing. The embracing action of the jacket 44 holds the ends of the tubular batt in close contact with the tapered flanges of the end caps, and as the jacket forces the batt inwardly towards the pleated paper filter the ends of the batt are wedged against these inclined flanges 42 and 43.

When this air filter cartridge is placed within the filter housing, the lower end of the cartridge will be properly centered in the housing by the annular flange 16 above mentioned, and the filter cartridge will rest upon the annular gasket 47 which lies upon the metal member 14. Since the housing cover 18 is constantly urged downwardly upon the filter housing by the springs 21, it will maintain sufficient pressure on the cartridge to keep the same firmly seated on the gasket 47.

As above pointed out, the filter cartridge of the present invention is so constructed that the filter batt serves to remove from the air stream the fine dust particles that would more quickly plug the porous pleated paper if allowed to reach the same, and the coarse particles of dirt that are carried through the batt by the air stream lodge on the outer surface of the pleated paper element to form a more porous layer through which air can readily pass. As a result of such construction, this dual filter operates in a highly satisfactory manner to clean the air passed therethrough and is capable of operating for a long period of time without becoming plugged with dirt. This dual construction makes a far better filter than the batt alone or the pleated paper element alone, but in order to secure its best operation, the rate of flow of air through the filter cartridge and the construction of the filter batt and pleated paper must be such as to cause the removal of the fine and coarse dirt in the manner above mentioned.

There are several reasons why a particle of dust will cling to the pre-filter batt 38, including mutual attraction (gravity), interference, and law of probability. Any two particles of any material have a mutual attractive force (gravity) which is directly proportional to their mass and inversely proportional as the square of the distance between them. If a particle is brought into close proximity with a fiber of filter media, it can and will be attracted to that fiber, provided it does not have sufficient kinetic energy and/or momentum to overcome that attractive force. This is also true of the principle of interference and can also explain the law of probability because there is insufficient area, generally, around fibers of the batt to permit a direct straight line flow of a particle through the batt thickness without encountering a fiber, or at least the law of probability would mean that a very small percentage of particles could find a direct path through the batt.

In this connection, it should be pointed out that since the fine dust particles are prevented by the batt from reaching the pleated paper which serves as a screen to stop the coarse dust particles, the pores of this paper may be relatively large with the result that air can pass relatively freely therethrough. It should also be noted that if the filter batt is to operate in the manner above described so that the coarse particles will pass therethrough, its construction must be fairly open. This will permit the air to pass relatively freely through such batt. The filter cartridge of the present invention will remove both coarse and fine dirt from the air screen very effectively without seriously retarding the flow of air therethrough. Furthermore, since generally only the fine dust particles lodge in the batt and the coarse dust passes therethrough, the batt should operate for a long period of time without becoming plugged. The coarse dust particles which lodge on the outer face of the pleated paper do not seriously interfere with the passing of air through such pleated paper. If the vibrations of the engine are imparted to the filter cartridge, such coarse dust particles will to a large degree be dislodged from the pleated element by these vibrations, particularly if the cartridge is so installed that the pleats extend in an upright direction. Also, such coarse dirt will tend to free itself from the pleated element and fall into the bottom of the receptacle when the air flow through the cartridge ceases.

The batt 38 preferably is a half inch or more thick and is formed of a blend of coarse and fine fibers intermixed to cause the batt to remove the fine dust particles but permit the coarse particles to pass therethrough at the working velocity at which the air filter was designed to operate. The batt may be formed of thermoplastic fibers which are bonded one to the other at their crossing points by applying just the right heat and pressure to the batt to soften the surface of the fibers and cause them to bond one to the other, or the bond can be formed by other bonding means. This filter batt must have the proper construction for the rate of air flow therethrough and should be formed of individual textile fibers that are spaced sufficiently from each other to permit the large dust particles to pass therethrough while the fine dust particles will adhere to these fibers.

Two factors contribute to the operation just described whereby the fine dust particles are retained by the batt while the large dust particles pass therethrough. These factors are:

First, a dynamic action whereby the energy of a large dust particle is great due to its large mass so that its total motion will not be stopped by the intercepting fibers; and Second, a static action whereby if the larger particles are stopped, the aerodynamic force on such particles is great with relation to the mutual attraction between the fibers and particles, and the particles will be removed from the fibers by the force of the air.

On the other hand, the fine dust particles which are subjected to a much less degree to the forces just mentioned will remain on the fibers due to the mutual attraction. A factor to be considered in addition to the separating action just mentioned is the total face area of the filter cartridge which for any given engine determines the total velocity of the passage of the air through the various portions of the air filter cartridge. The thickness and porosity of the batt and porosity of the pleated paper should bear such relation to the total flow of air therethrough that the batt will retain the fine dust particles which would plug the paper if allowed to reach the same, and the batt will allow the coarse particles to lodge on the paper where they do not appreciably interfere with the passage of air through the paper. As a result of this construction, neither filter element under proper operating conditions should be subjected to serious plugging action, and the active life of the dual filter of the present invention should be long and its efficiency high. For example, an efficiency of 99.8% or better should be secured.

Having thus described the invention, what is claimed is:

A two-stage air filter cartridge of the outside-in flow type comprising an apertured center core, a pleated paper filter element surrounding said core, a thick replaceable filter batt surrounding the pleated paper element, an end plate secured at one end of the pleated paper element and a second end plate having a central air discharge passage secured at the other end of said element so that these end plates are retained in permanent fixed relation to each other, each end plate having a smooth beveled annular flange that projects outwardly from the pleated paper filter a distance approximately equal to the thickness of the batt, and which flanges diverge from each other in an outward direction throughout said distance to form inclined slideways for the ends of the batt so that these flanges exert a wedging pressure on the ends of the batt when it embraces the pleated paper filter, and a removable split clamping jacket constructed to embrace the batt and force it inwardly to wedgingly engage the batt ends with said diverging flanges.

References Cited in the file of this patent

UNITED STATES PATENTS

| | | |
|---|---|---|
| 1,943,592 | Farmer | Jan. 16, 1934 |
| 2,170,074 | Hewitt | Aug. 22, 1939 |
| 2,597,927 | Endres | May 27, 1952 |
| 2,795,290 | Butsch et al. | June 11, 1957 |

FOREIGN PATENTS

| | | |
|---|---|---|
| 622,279 | Great Britain | Apr. 29, 1949 |
| 660,864 | Great Britain | Nov. 14, 1951 |
| 711,735 | Great Britain | July 7, 1954 |
| 989,832 | France | May 30, 1951 |